United States Patent Office 2,956,929
Patented Oct. 18, 1960

2,956,929

TYROSINASE CONCENTRATE AND EXTRACTANT AND METHOD FOR MAKING SAME

Erwin M. Cohen and Louis L. Lerner, Chicago, Ill., assignors to The Gillette Company, Boston, Mass., a corporation of Delaware No Drawing. Filed Apr. 24, 1958, Ser. No. 730,546

9 Claims. (Cl. 195—68)

This invention relates to the preparation of a tyrosinase concentrate and pertains more specifically to a tyrosinase concentrate having improved color and activity characteristics prepared by an extraction process from a naturally occurring source, as well as to process of preparing it and the novel extractant employed for that purpose.

One object of the present invention is to provide an improved tyrosinase concentrate of high activity and of improved color.

Another object is to provide an improved extraction process for the preparation of a tyrosinase concentrate from a naturally occurring source.

Still another object is to provide an improved extractant for a naturally occurring tyrosinase which minimizes discoloration and degradation of the tyrosinase during the extraction and concentration process.

A further object is to provide a simple and readily controlled extraction process for producing a high activity tyrosinase concentrate having a decreased content of color impurities.

Other and further objects will be apparent from the description which follows.

Tyrosinase, an enzyme which is effective for producing melanin pigments, is a naturally occurring enzyme which has been isolated from a number of different sources. The naturally occurring material which is generally regarded as being the best and most convenient source for this enzyme is a mushroom (*Psalliota campestris*), although the enzyme may also be obtained from Idaho potatoes, yams, cuttlefish ink sac, and from arthropod blood. In general the procedure for preparing the enzyme concentrate from any of these sources is to extract the enzyme from the naturally occurring source material by means of an aqueous extractant medium in which water may be the sole liquid solvent or which may contain a mixture of water and acetone or water and alcohol as the liquid solvent. The term "aqueous solution" or "aqueous extractant" as used hereinafter is intended to include any liquid solvent or solvent mixture containing more than 50% by weight of water.

Although a considerable amount of work has been done in an effort to improve the procedure and obtain a tyrosinase concentrate of better quality, there has remained the basic difficulty that the tyrosinase is subject to oxidation by the air of the atmosphere. Concentrates which have heretofore been obtained have been dark colored because of the presence of pigments formed in situ during the extraction procedure and have been low in activity; for example, one firm markets a concentrate having an activity of the order of 1 catecholase unit per milligram of dry concentrate. This is mostly due to the decomposition or deterioration of the tyrosinase during the extraction procedure. Despite many attempts to increase the yield of tyrosinase from a source such as mushrooms, for example by the preliminary steps of freezing and thawing mushroom pulp prior to extraction, these steps have failed to provide any substantial improvement in color or activity (purity) of the final concentrate.

It has now been discovered that by employing as the extractant an aqueous solution containing dissolved therein a reducing agent for orthoquinones together with a competitive inhibitor for tyrosinase, not only are the yield and activity of the concentrate greatly increased, but in addition the procedure for the extraction may be simplified and shortened.

Although a number of different reducing agents for orthoquinones are known, any one or more of which may be employed in the present invention, best results have been obtained with ascorbic acid and with hydroquinone. Coenzyme II in its reduced form is also an effective reducing agent for orthoquinones, but its cost at the present time is so high that its use is not practical from an economic point of view. It has been found that an aqueous extractant containing as little as 0.5% by weight of reducing agent is effective for the purposes of the present invention. While larger quantities may be employed up to the point at which the aqueous solution becomes saturated with the reducing agent (up to 30% by weight in the case of ascorbic acid), the use of such large quantities is not necessary to achieve the desired results. In general, it has been found that an amount of reducing agent from 1% to 5% by weight of the aqueous extractant solution provides best results.

The competitive inhibitor of tyrosinase which is employed in combination with the reducing agent in the aqueous extractant solution may be any one or more of the conventional competitive inhibitors, among which are benzoic acid, o-chlorobenzoic acid, o-hydroxybenzoic acid, o-methoxybenzoic acid, o-toluic acid, 1-cinnamic acid, methyl benzoate, methyl salicylate, acetophenone, nicotinic acid, cyclohexane carboxylic acid, trimethyl acetic acid, and the like. Of these benzoic acid has been found to be most effective and is preferred. While as little as 0.02% by weight of competitive inhibitor based on the total weight of aqueous extractant solution may be employed, it is generally desirable to employ a saturated solution which contains, in the case of benzoic acid, about 0.2% by weight, based on the total weight of the aqueous extractant solution.

In carrying out the process of the present invention, the aqueous extractant solution containing dissolved therein the desired reducing agent for orthoquinones together with a competitive inhibitor of tyrosinase is employed to extract the source material in the usual manner while maintaining the temperature close to 0° C. (from —5° C. to +10° C.). The pH of the extractant is preferably maintained from 5.2 to 5.5, a small amount of dilute ammonium hydroxide being employed to adjust the pH to a value within the desired range when necessary. The source material may be previously crushed or chopped into small pieces in order to ensure thorough extraction, and it is also desirable in many cases to subject the source material to further grinding, maceration or attrition during the extraction step. The amount of extractant solution employed is a matter of choice; the greater the ratio of extractant to source material, the more thorough the extraction will be, but the more liquid must be removed to achieve the final dry concentrate.

After separation of the aqueous extract from the source material in a conventional filtering operation, the source material may be subjected to one or more additional extractions with a fresh batch of aqueous extractant. The extractant solution containing the tyrosinase is then treated either with a salt solution or with acetone in order to precipitate the tyrosinase. While a number of different water-soluble salts containing polyvalent anions may be employed for precipitating or "salting out" the tyrosinase, best results have been obtained with ammonium sulfate, the extractant solution preferably being made 0.8 saturated with the ammonium sulfate. When acetone is employed as the precipitant, best results are obtained by employing an amount of acetone which is from 1.2 to 1.7 times the volume of the aqueous extractant solution. In either case the extractant solution should be maintained at a low temperature during the precipitation step, which requires from 10 to 60 minutes for completion, the temperature preferably being maintained below 10° C., and in the case where acetone is employed as the precipitant, being preferably maintained below −10° C.

The resulting precipitate is collected by a conventional filtering step. In order to obtain a product of high activity, the steps of dissolving the tyrosinase in aqueous extractant solution and precipitating it therefrom may be repeated as many times as desired until no further increase in activity of the product is attained. The precipitation step serves to separate the tyrosinase from the reducing agent and competitive inhibitor which tend to remain in solution.

When a salt such as ammonium sulfate has been employed as the precipitant, the precipitate is then dissolved in water and subjected to dialysis to remove any coprecipitated salt, whereupon it may be lyophilized (freeze-dried). When acetone has been employed as the precipitant, no dialysis step is required, the precipitate simply being dissolved in water and subjected to final concentration by a conventional lyophilization step. It is important that the lyophilization step be as complete as possible to provide a dry, stable product.

The product of the present invention prepared as described above has an activity of at least 10 catecholase units per milligram of dry concentrate in the case of the product made using a salt precipitant. In the case of the product made by using acetone as the precipitant, the product has an activity of at least 80 catecholase units per milligram of dry concentrate.

In order to illustrate more clearly the nature of the present invention, the following specific examples are described without any intention to limit the present invention to these examples.

Example 1

Ten pounds of mushrooms are soaked in 5 gallons of tap water to remove surface dirt, the wash water is drained, and the mushrooms are then ground in a Waring Blendor with 8 liters of deionized water containing 2 liters of crushed ice and 1% by weight of ascorbic acid together with 0.2% by weight of benzoic acid. The pH of the solution is adjusted to 5.5 with a small amount of dilute ammonium hydroxide, the pH being maintained between 5.2 and 5.5 throughout the extraction step. After completion of the grinding, the mixture is stirred gently for about an hour while maintaining the temperature at approximately 0° C. to permit extraction of the tyrosinase from the mushrooms. At the end of this time the mixture is filtered, the residue being extracted in the filter with an additional quantity of approximately 3 liters of extractant consisting of an aqueous solution containing 1% of ascorbic acid and 0.2% of benzoic acid at pH 5.5. The two filtrates are combined and sufficient ammonium sulfate is added to make the solution 0.8 saturated while maintaining the temperature at approximately 0° C.

The solution is allowed to stand for approximately 3 hours, during which time a solid precipitate separates and in large part floats to the top of the dense solution. At the end of this time the mixture is filtered and the solid material is washed with a cold aqueous solution containing ammonium sulfate 0.8 saturated. The solid material thus separated is dissolved in cold deionized water (approximately 0°–5° C.), placed in a sausage casing (Visking), and dialyzed against cold deionized water until a test of the dialyzate with barium chloride solution gives no precipitate. Throughout the dialysis step the temperature is maintained as low as possible, usually between 0° C. and 5° C.

After completion of the dialysis, the solution is lyophilized or freeze-dried and the solid which is collected may then be stored in a closed container under refrigeration. The product is light colored and has an activity of 16 catecholase units per milligram of dry weight.

Example 2

The process described in Example 1 is carried out up to the point of addition of ammonium sulfate. In place of the ammonium sulfate there is added an amount of acetone equal to 1.5 times the volume of the aqueous solution, and the mixture is allowed to stand to permit precipitation to occur while maintaining the temperature at −10° C. or lower. The precipitate is separated from the solution by filtration, washed with a mixture of acetone and water (3:2 by volume) at −10° C., and then dissolved in a few liters of cold (0° C.) deionized water. The precipitation by means of acetone is repeated until the activity of the precipitate shows no further increase. Usually two repetitions of the precipitation suffice. The precipitate is then dissolved in cold deionized water and lyophilized to produce a dry solid product very light tan in appearance having an activity of 100 catecholase units per milligram.

It will be noted that when acetone is used as the precipitant, the dialysis step may be omitted since there is no salt to be precipitated or occluded with the tyrosinase precipitate.

Similar results are obtained when there is employed as the extractant solution a mixture of water with 30% by weight of acetone, in which mixture are dissolved the orthoquinone reducing agent and the competitive inhibitor of tyrosinase.

Although specific embodiments of the invention have been described herein, it is not intended to limit the invention solely thereto, but to include all of the obvious variations and modifications within the spirit and scope of the appended claims.

What is claimed is:

1. In the process of preparing a tyrosinase concentrate by extraction from a naturally occurring source at a temperature from −5° to +10° C., the step which comprises employing as the extractant an aqueous solution containing at least 0.5% by weight of a member of the class consisting of ascorbic acid and hydroquinone, and at least 0.1% by weight of a competitive inhibitor of tyrosinase.

2. In the process of preparing a tyrosinase concentrate by extraction from a naturally occurring source at a temperature from −5° to +10° C., the step which comprises employing as the extractant an aqueous solution containing at least 0.5% by weight of ascorbic acid and at least 0.1% by weight of benzoic acid.

3. In the process of preparing a tyrosinase concentrate by extraction from a naturally occurring source at a temperature from −5° to +10° C., the steps which comprise employing as the extractant an aqueous solution containing at least 0.5% by weight of a member of the class consisting of ascorbic acid and hydroquinone and at least 0.1% by weight of a competitive inhibitor of tyrosinase, and adding ammonium sulfate to said extractant solution to precipitate a tyrosinase-rich material therefrom.

4. The process defined in claim 3 comprising in addition the steps of forming an aqueous solution of said tyrosinase-rich material and subjecting said solution to dialysis and then to lyophilization.

5. In the process of preparing a tyrosinase concentrate by extraction from mushrooms at a temperature from −5° to +10° C., the steps which comprise employing as the extractant an aqueous solution containing at least 0.5% by weight of a member of the class consisting of ascorbic acid and hydroquinone and at least 0.1% by weight of a competitive inhibitor of tyrosinase, and then adding acetone to said extractant solution to precipitate a tyrosinase-rich material.

6. The process defined in claim 5 comprising in addition the steps of forming an aqueous solution of said tyrosinase-rich material and subjecting said solution to lyophilization.

7. In the process of preparing a tyrosinase concentrate by extraction from mushrooms at a temperature from −5° to +10° C., the steps which comprise employing as the extractant an aqueous solution containing at least 0.5% by weight of ascorbic acid and at least 0.1% by weight of benzoic acid, adding acetone to said extractant solution to precipitate a tyrosinase-rich material, forming an aqueous solution of said tyrosinase-rich material, and subjecting said solution to lyophilization to provide a dry solid tyrosinase concentrate.

8. An extractant for use in preparing a tyrosinase concentrate from a naturally occurring source which comprises an aqueous solution containing dissolved therein at least 0.5% by weight of a member of the class consisting of ascorbic acid and hydroquinone, and at least 0.1% by weight of a competitive inhibitor of tyrosinase.

9. An extractant for use in preparing a tyrosinase concentrate from a naturally occurring source which comprises an aqueous solution containing dissolved therein at least 0.5% by weight of ascorbic acid and at least 0.1% by weight of benzoic acid.

References Cited in the file of this patent

Advances In Enzymology by Nord et al., Interscience Publishers Inc., New York (1944), vol. 4, pp. 101, 102, 116, 117, 121 and 122.

Chemistry and Methods of Enzymes by Sumner et al., Academic Press Inc., 1953, New York, pp. 240 to 243.

Methods In Enzymology by Colowick et al., Academic Press Inc., New York, 1955, vol. 2, pp. 822 to 827.